3,053,916
POLYMERIZATION OF ETHYLENE IN THE PRESENCE OF KETONE PROMOTERS

Thomas P. Wilson, Charleston, and George F. Hurley and Robert M. Manyik, St. Albans, W. Va., assignors to Union Carbide Corporation, a corporation of New York
No Drawing. Filed July 26, 1960, Ser. No. 45,296
4 Claims. (Cl. 260—683.15)

This invention relates to a process for the polymerization of ethylene. More particularly it is concerned with an improved process for polymerizing ethylene, and of mixtures thereof with other olefins, to produce liquid condensates.

The production of liquid products from ethylene has long been known. It has now been found that high yields of liquid unsaturated condensates of ethylene can be produced by heating the mixture of ethylene and catalyst while in contact with a ketone as a promoter for the reaction.

By the process of this invention, unsaturated liquid polymers, or condensates, of ethylene are produced by contacting ethylene at a pressure of from about 200 p.s.i.g. to as high as about 4000 p.s.i.g. or more and at a temperature of from about 100° C. to about 325° C. with a suspension of potassium or sodium metal as catalyst in an inert organic solvent, and a ketone as promoter. In a preferred embodiment of this invention, temperatures of from about 150° C. to about 225° C. and pressures of from about 500 p.s.i.g. to about 2000 p.s.i.g. are employed. Higher temperatures and pressures than those specified can be used, but under such conditions wax-like products are favored even though the reaction rate is greater; agitation is, of course, beneficial, and the reaction can be carried out in either a continuous or batch-wise manner.

The catalysts useful in the process of this invention are metallic potassium and sodium and alloys or mixtures thereof. Surprisingly, lithium was found to be ineffective as a catalyst. The catalyst is present in the form of a finely divided suspension having an average particle size of from about 0.5 to about 250 microns and preferably from about 2 to about 25 microns in an inert organic solvent, such as heptane, decalin, nonane, cumene, and so forth. Any inert organic solvent which does not interfere with the reaction can be used. The concentration of the catalyst can be varied from about 1 percent to about 10 percent by weight, or more, based on the total weight of the monomers charged. The preferred catalyst concentration is from about 2.5 percent to about 7.5 percent by weight; and, if desired, the catalyst can be supported on an inert carrier.

It has now been found that the addition of a promoter to the catalyzed reaction mixture results in a smooth, efficient reaction having a high conversion rate. This promoter is a ketone which can react with the catalyst, potassium or sodium metal, to produce a ketyl. The ketones which react with potassium or sodium to form ketyls are the diaryl ketones and the quinones which are free of enolizable hydrogen atoms. The ketyl-forming reaction with a diaryl ketone, using potassium for illustrative purposes, can be represented by the following equation, in which Ar represents an aryl or substituted aryl radical:

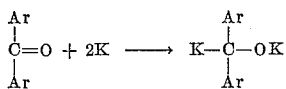

With a quinone the ketyl-forming reaction can proceed to form a mono-ketyl (I) or a di-ketyl (II) as illustrated below with anthraquinone:

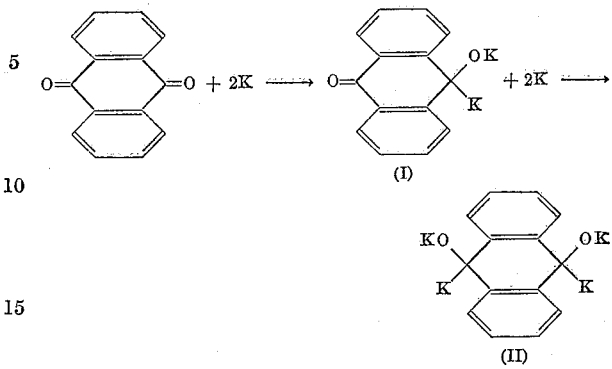

Among the suitable ketyl-forming diaryl ketones and quinones one can mention, for example, benzophenone, bis(1-naphthyl)ketone, anthraquinone, phenanthraquinone, and the like.

The promoter is present in the reaction at concentrations of from about 0.5 percent to about 10 percent by weight based on the total weight of the monomers charged, with the preferred promoter concentration being from about 1 percent to about 5 percent by weight. The need for a promoter is demonstrated by the fact that under the same reaction conditions but in the absence of promoter, there is little indication of polymerization.

The following examples further serve to illustrate the invention, but are not to be construed as being limitative thereof.

Example 1

A 1200 milliliter stainless steel rocking autoclave was charged with 200 milliliters of decalin as solvent and 3.5 grams of benzophenone as promoter. The autoclave was purged with nitrogen, 2.3 grams of finely divided sodium and 7.7 grams of finely divided potassium were added as catalyst, and the autoclave was sealed and purged with ethylene. Ethylene was then added until a pressure of 660 p.s.i.g. was obtained, and the reactor was sealed. The autoclave was heated to 150° C. and the reaction was allowed to proceed for 18.5 hours at this temperature over a pressure range of from 1210 p.s.i.g. to 470 p.s.i.g. At the end of this period the reactor was cooled, vented to remove unreacted monomer, and isopropanol was injected to destroy the excess catalyst. The reaction mixture was filtered to remove a small amount of solid matter, and the filtrate was distilled to give 74.5 grams of a mixture of liquid polymeric condensates of ethylene. This liquid condensate was fractionally distilled into four fractions which were identified as consisting of (a) hexenes, (b) octenes, (c) decenes, and (d) higher alkenes.

When the experiment was repeated using ethylene as the monomer but omitting the benzophenone promoter, there was only a very slight drop (about 15 p.s.i.g.) in the pressure of the reactor during the 19.5 hour heating period indicating little reaction had occurred. Upon working up the reaction mixture, no fractions having a molecular weight higher than that of the starting monomer were found, indicating that the reaction did not proceed in the absence of promoter.

Example 2

In a manner similar to that described in Example 1, ethylene was polymerized to yield 94.3 grams of liquid condensation products. The promoter used was 4.2 grams of anthraquinone; and the catalyst was a mixture of 2.3 grams of sodium and 7.7 grams of potassium. The liquid product was fractionally distilled into fractions which were identified as consisting of (a) hexenes, (b) octenes, (c) decenes, and (d) higher alkenes.

The use of potassium alone as catalyst in the above experiment produces a similar mixture of alkenes.

What is claimed is:

1. In the process for producing liquid condensates of ethylene, which comprises introducing a charging stock consisting of ethylene, an inert organic diluent, and as a catalyst a finely divided suspension of a metal selected from the group consisting of potassium and sodium into a reaction zone at a temperature of from about 100° C. to about 325° C. and a pressure of at least about 200 p.s.i.g. and recovering and fractionally distilling the liquid ethylene condensates thus produced, the improvement which comprises carrying out the catalytic condensation in contact with a ketyl-forming promoter selected from the group consisting of diaryl ketones and quinones.

2. In the process for producing liquid condensates of ethylene, which comprises introducing a charging stock consisting of ethylene, an inert organic diluent, and as a catalyst a finely divided suspension of a metal selected from the group consisting of potassium and sodium into a reaction zone at a temperature of from about 150° C. to about 225° C. and a pressure of from about 500 p.s.i.g. to about 2000 p.s.i.g., and recovering and fractionally distilling the liquid ethylene condensates thus produced, the improvement which comprises carrying out the catalytic condensation in contact with a ketyl-forming promoter selected from the group consisting of diaryl ketones and quinones.

3. A process as claimed in claim 1, wherein the promoter is benzophenone.

4. A process as claimed in claim 1, wherein the promoter is anthraquinone.

References Cited in the file of this patent

UNITED STATES PATENTS

| | | |
|---|---|---|
| 2,740,820 | Wilson et al. | Apr. 3, 1956 |
| 2,881,234 | Esmay et al. | Apr. 7, 1959 |